(No Model.)
J. H. McCABE.
VEHICLE FIFTH WHEEL.
No. 302,755. Patented July 29, 1884.
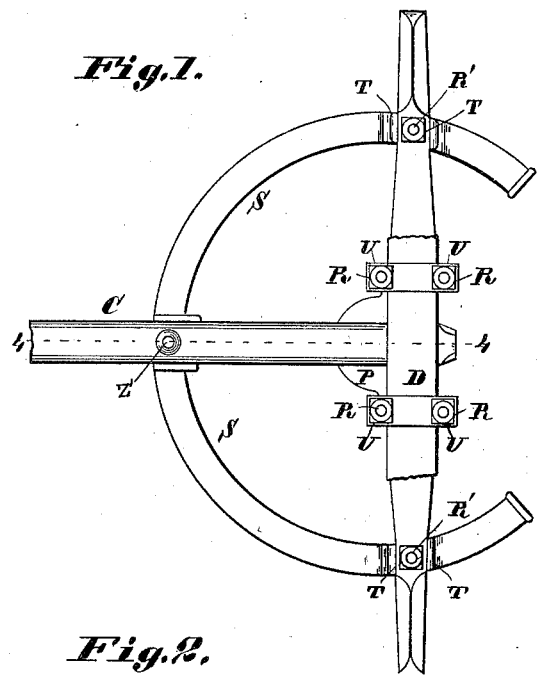
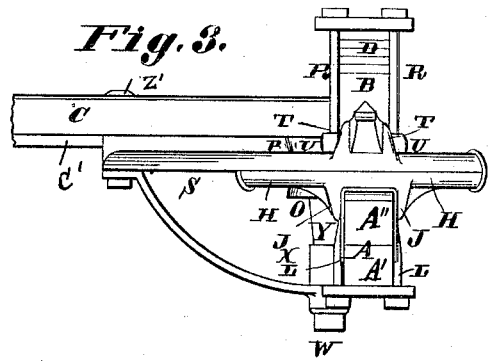
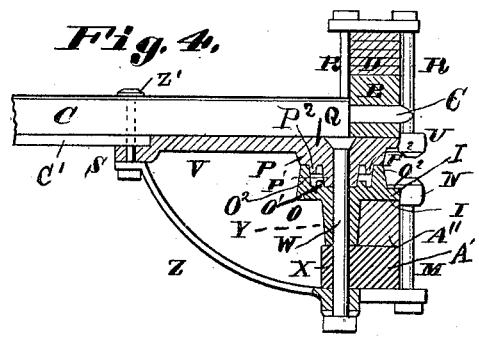
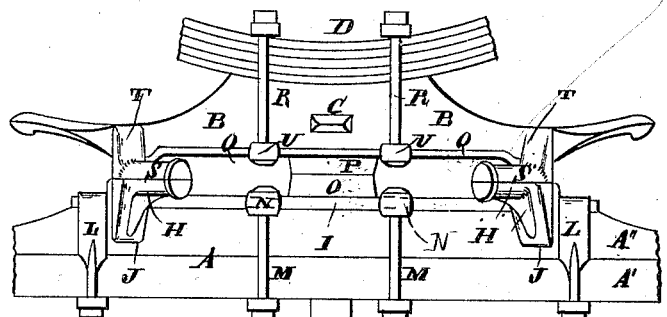
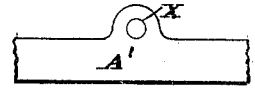
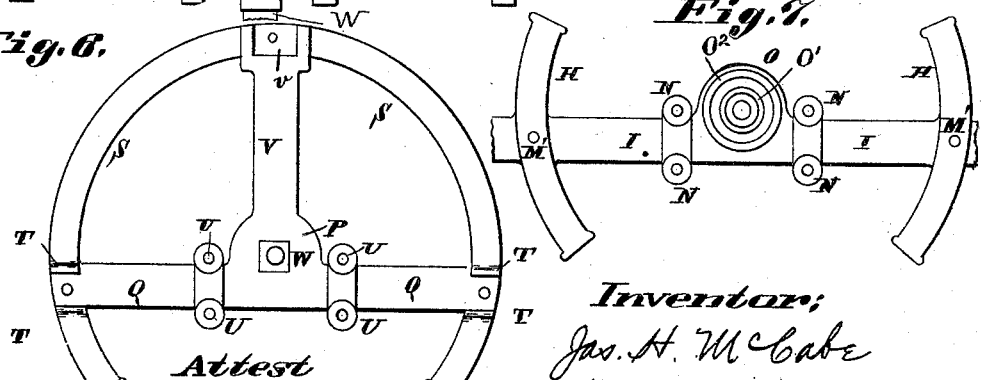
Attest
Benj. A. Knight
Geo. S. Wheelock
Inventor:
Jas. H. McCabe
By Knight Bros
Attys
N. PETERS, Photo-Lithographer, Washington, D. C.

UNITED STATES PATENT OFFICE.

JAMES H. McCABE, OF ST. LOUIS, MISSOURI.

VEHICLE FIFTH-WHEEL.

SPECIFICATION forming part of Letters Patent No. 302,755, dated July 29, 1884.

Application filed December 21, 1883. (No model.)

*To all whom it may concern:*

Be it known that I, JAMES H. MCCABE, of the city of St. Louis, in the State of Missouri, have invented a certain new and useful Improvement in Fifth-Wheels, of which the following is a full, clear, and exact description, reference being had to the accompanying drawings, forming part of this specification, and in which—

Figure 1 is a top view of my improved fifth-wheel, omitting the ends of the spring. Fig. 2 is a front view. Fig. 3 is a side view. Fig. 4 is a vertical section taken on line 4 4, Fig. 1. Fig. 5 is a detail view showing the middle part of the front axle of a vehicle, upon the inner side or face of which I form or secure a lug or projection, illustrated in this figure, which is perforated to receive the king-bolt. Fig. 6 is a top view of the upper member. Fig. 7 is a top view of the lower member.

My invention relates to fifth-wheels for use on all kinds of vehicles; and my invention consists in features of novelty hereinafter fully described, and pointed out in the claim.

Referring to the drawings, A represents part of the front axle of a vehicle, which may consist, as I have shown it, of a lower metal piece, A′, and an upper wooden piece, A″.

B represents the head-block, C part of the reach, and D part of the front spring. All of these parts may be of any ordinary form or construction.

H H represent segments secured to the axle. They are connected by and formed in one piece with a plate, I, having downwardly-projecting lugs J, which embrace the axle. The segments and plate are connected to the axle by clips or straps L, and by bolts M, the latter of which pass through perforated lugs or projections N, formed upon the plate.

Formed upon the upper part of the plate I, near its middle, is a journal projection, O, upon which bears a similar journal projection, P, formed upon the under side of a plate, Q, secured to the head-block by bolts R, and connecting the free ends of the segment S of the fifth-wheel. The segment S and plate Q are formed in one piece, and have upwardly-projecting lugs T formed thereon, which embrace the head-block. The bolts R pass through lugs U, formed upon the plate Q. The central parts of the plate Q and segment S are connected by an arm, V, formed in one piece therewith. The rear end of the arm V is formed with a recess, v, which receives the reach-plate C′.

W represents the king-bolt connecting the parts together by passing through the plates I and Q, which are perforated to receive it, and through a perforated lug, X, above mentioned, formed upon the inner side of the metal part of the axle. The perforations in the plates through which the king-bolt passes are made through the centers of the journal projections O P. Beneath the projection O is a downwardly-extending projection, Y, through which the king-bolt also extends, and which rests upon the projection or lug X of the axle. The wooden part of the axle fits between this projection Y and the bolts M, and thus gives additional strength to the parts. The lower face of the projection P has a central extension, P′, (see Fig. 4,) which bears upon the upper face of the projection O within an annular rib, O′, formed upon the lower projection; and the upper face of the projection O has an annular rib, O², upon which bears the outer edge of the lower face of the projection P. The lower face of the projection P has an annular rib, P², which fits within the rib O².

A brace, Z, is employed to form a connection between the middle of the axle and the segment S. This brace is secured to the axle by fitting over the lower end of the king-bolt, (see Fig. 4,) and to the segment S and reach through the recess v and reach-plate V by bolt Z′.

The segment S may be an entire circle, if desired, and, in addition to the described connections for securing it to the head-block, bolts R′ may be employed, and, in addition to the connections for securing the plate I and segments H to the axle, bolts may be employed which would pass through holes M′. (See Fig. 7.)

A fifth-wheel thus formed of two solid parts is strong and durable, is not liable to get out of order, and can be cheaply produced.

I claim as my invention—

A fifth-wheel consisting of axle A, having a lug, X, at the rear, lower member, I, having journal projections Y and O at the rear, the projection O being formed with concentric ribs O' and O², the upper member, Q, having journal projection resting on the projection O, and formed with central extension, P, surrounded by the rib O', and rib P², surrounded by the rib O², and the king-bolt W, passed through the journals and lug, as shown and described.

JAMES H. McCABE.

In presence of—
GEO. H. KNIGHT,
BENJ. A. KNIGHT.